Sept. 20, 1971 L. M. BRANNAN 3,605,657
METHOD AND APPARATUS FOR APPLYING DRY FERTILIZER AND
ANHYDROUS AMMONIA IN A COMMON BAND
Filed April 7, 1969 2 Sheets-Sheet 1
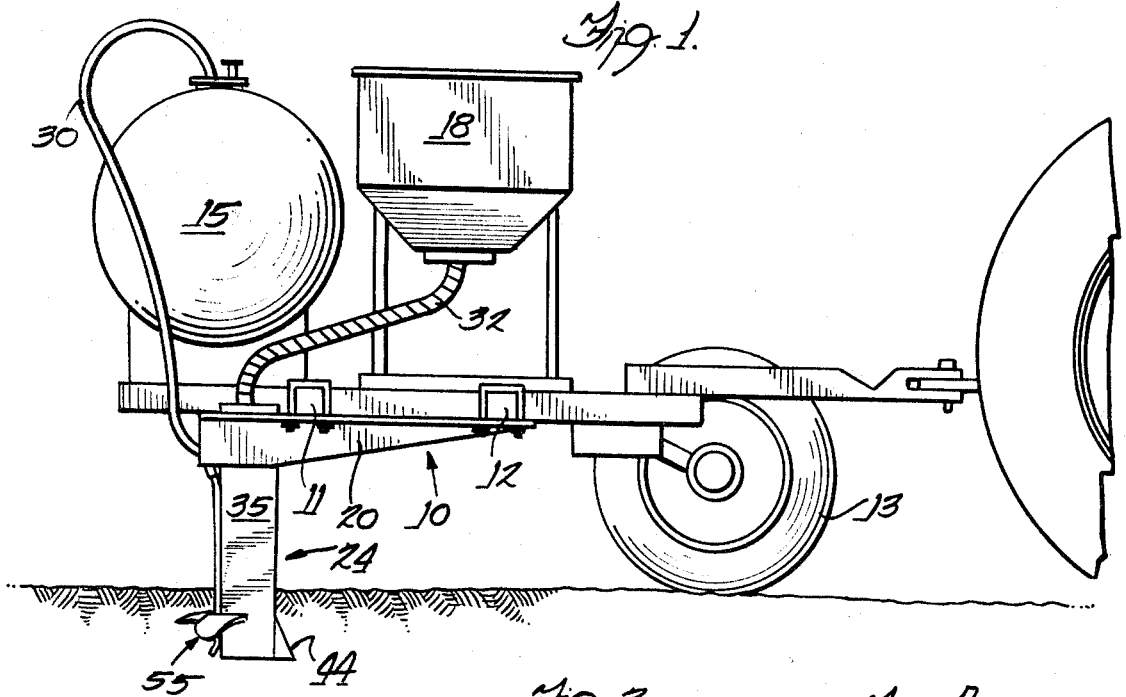
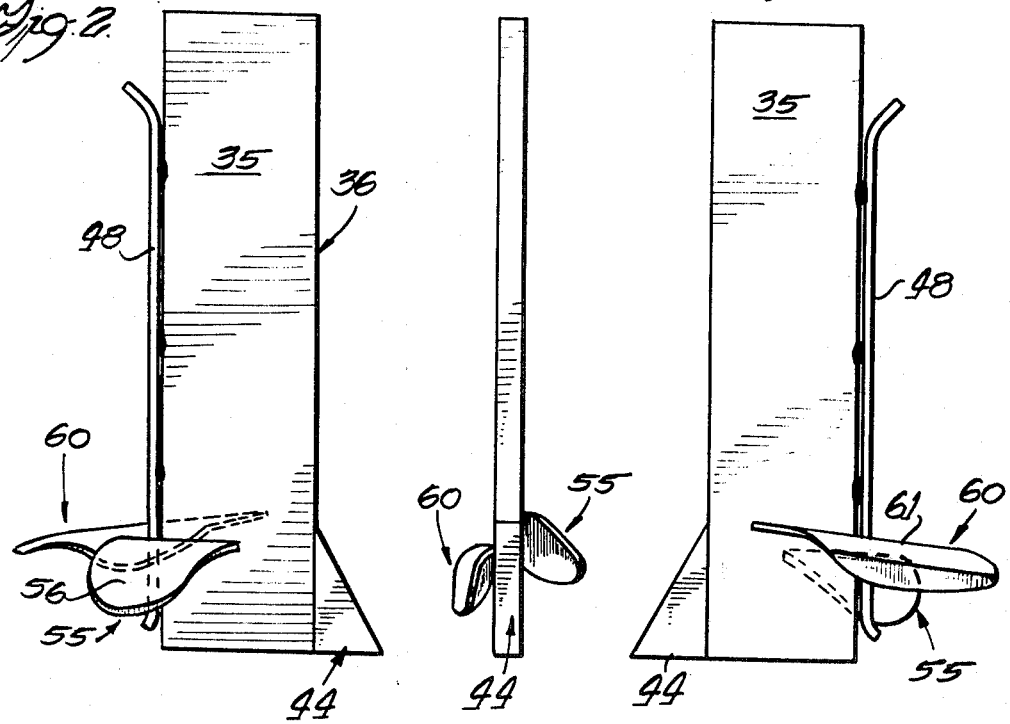
Inventor
Leonard M. Brannan
by Dawson, Tilton, Fallon
& Lungmus
Att'ys

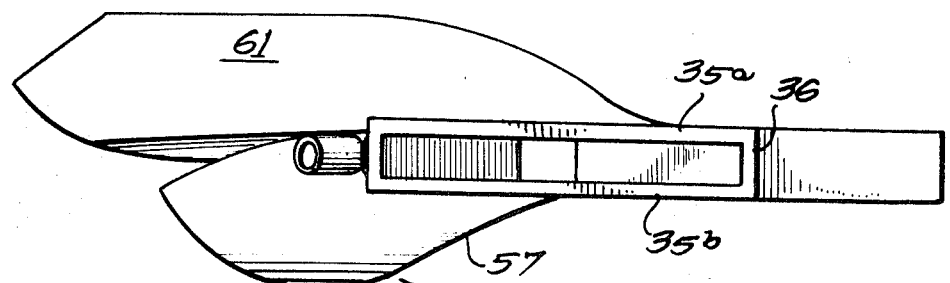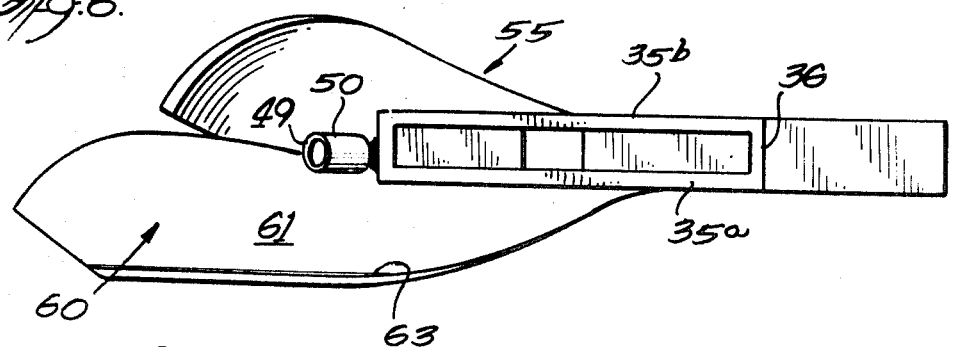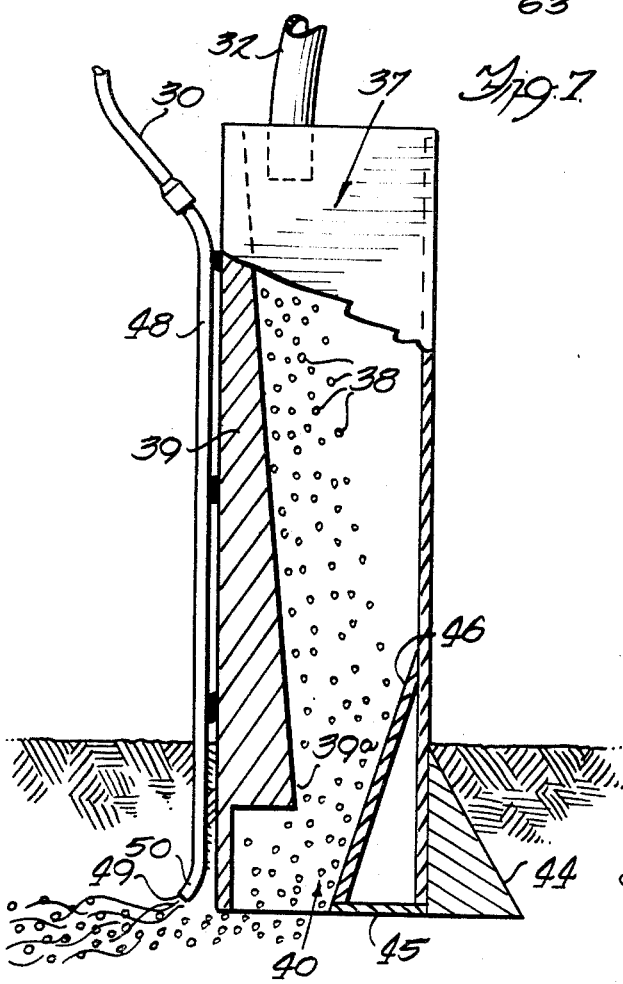

United States Patent Office 3,605,657
Patented Sept. 20, 1971

3,605,657
METHOD AND APPARATUS FOR APPLYING DRY FERTILIZER AND ANHYDROUS AMMONIA IN A COMMON BAND
Leonard M. Brannan, 3008 Paddock Road, Apt. 211C, Omaha, Nebr. 68124
Filed Apr. 7, 1969, Ser. No. 813,968
Int. Cl. A01c 23/02
U.S. Cl. 111—7                                    6 Claims

ABSTRACT OF THE DISCLOSURE

Method and apparatus is disclosed for chemically combining a dry fertilizer and anhydrous ammonia in a band at a predetermined depth beneath the soil surface. A plowing knife is introduced into the soil and pulled by a surface traction vehicle to form a channel of predetermined depth. A band of dry fertilizer is deposited in the bottom of the channel by the plow via a conduit extending longitudinally of the knife; and anhydrous ammonia contacts the deposited dry fertilizer at a location behind the deposited dry fertilizer. The anhydrous ammonia is carried by means of a closed conduit attached to the rear of the knife and slight rearwardly inclined at its lower end so that the point of application of ammonia to the band is at a location rearward of the shank. Attached to one side of the plow knife is an inverted moldboard for gathering soil from the side of the knife and routing it behind the knife over the point of application of ammonia rearward of the knife to cover the ammonia and prevent its escape in gaseous form into the atmosphere. A second inverted packing moldboard is attached to the other side of the knife for gathering soil and routing it behind the knife and packing it down above the point of application of the ammonia.

BACKGROUND AND SUMMARY

The present invention relates to a method of introducing fertilizer into the ground at sub-surface levels; more particularly, it relates to a method and apparatus for applying a dry fertilizer and anhydrous ammonia in a common band at a predetermined depth beneath the surface of the soil.

As used herein, the word "band" refers to a ribbon of fertilizer which is deposited at the base of a channel formed in soil to a depth of about six to twelve inches beneath the surface and having a width of approximately one-half to one inch.

Applicator knives have been in use for applying anhydrous ammonia beneath the surface of soil. In a typical application, a conduit is fed behind a plow knife approximately equal in width to the diameter of the ammonia conduit; and the anhydrous ammonia attaches to the clay particles eventually producing soluble nitrates which are useful fertilizer materials. Further, wing sealers have been welded to such knife blades which have a generally triangular plan form with the broader portion of the triangle tailing behind and tilted downwardly for loosening soil which then drops down in the channel to loosely fill the same.

Problems have been encountered with these applicator knives in that the anhydrous ammonia, when released at the base of the conduit contacts and chills the steel applicator knife, thereby collecting debris and crop residue by condensing and freezing moisture which engages the knife. This collection of soil and residue begins to increase the effective trenching width of the plow knife to a substantial width; and the gaseous ammonia escapes through this wider channel into the atmosphere. This is not prevented by the use of the wing sealer which, as already mentioned, merely loosens soil and may even increase the width of the channel due to freezing and collection of soil and residue. For example, the width of a channel may increase from an initial width of about one-half inch to a width of three to four inches thereby rendering the depositing of liquid ammonia almost totally ineffective.

Another system is known for applying dry fertilizers with anhydrous ammonia in which the dry fertilizers are separately stored; and the anhydrous ammonia is kept in a tank under pressure. The ammonia is fed directly behind the sole of a plow knife; and it contacts and cools the knife and thereby causes the previously-described problems of collecting residue on the sides of the chilled plow knife which create a wider channel and permits the escape of the gaseous ammonia into the atmosphere.

As already mentioned, accumulation of crop residue and soil on the sides of the chilled plow knives will widen the one-half inch width of the channel up to a width of about three to four inches under certain circumstances. This is considered to be a very serious problem in terms of the amount of anhydrous ammonia which escapes, increased power consumed in pulling the shanks which have accumulated debris, and loss of time on the part of an operator in shutting a vehicle down and clearing the crop residue from the plow knives. It will be appreciated that ordinarily, a plurality of such applicator knives are mounted on a common frame and pulled by the same traction vehicle to cover a wider swath in a single pass.

In this latter type of combined dry fertilizer and anhydrous ammonia applicator, the dry fertilizer is fed at a location behind and above the point of application of the ammonia. That is, the mouth of the conduit through which the dry fertilizer is fed into the band is located rearwardly of and above the exit portion of the ammonia, so that the dry fertilizer falls freely above the point into the channel where the ammonia is applied. A second problem is caused by this arrangement in that the escaping ammonia is permitted to move upwardly in the channel into the conduit through which the dry fertilizer is coupled thereby causing a reaction between the anhydrous ammonia and the dry fertilizer in the dry fertilizer conduit. This reaction creates heat and moisture thereby causing a progressively restrictive condition in the conduit feeding the dry fertilizer.

The present invention contemplates feeding the dry fertilizer through a vertical conduit formed in a plow knife. It will be appreciated by persons skilled in the art that a similar arrangement could be used for feeding liquid fertilizer or other plant nutrient elements in liquid or solid form through a similar conduit formed in the plow knife; and as used herein, the word "fertilizer" encompasses such other forms. The ammonia is fed by means of a generally vertically-disposed conduit attached to the rear of the plow knife and having an exit portion which is downwardly and slightly rearwardly inclined to form an orifice located behind, not adjacent to the knife. Thus, the dry fertilizer falls through the conduit in the plow knife under force of gravity and is deposited in a band at the base of a channel formed by the plow knife prior to the application of the anhydrous ammonia. As the shank is pulled along, the disposing orifice of the ammonia tube passes over the deposited band of dry fertilizer and directs the anhydrous ammonia onto the dry fertilizer.

It is of particular advantage that the dry fertilizer is funneled through a conduit which has its base or mouth at the bottom of the channel cut by the plow knife and located ahead of the ammonia release orifice. In some prior arrangements, the dry fertilizer was merely deposited at about ground surface and fell through the channel. It therefore spread against the sides of the channel.

Another feature of the instant invention is that the exit aperture for the ammonia tube is located rearwardly of the back portion of the plow knife and inclined downwardly and rearwardly therefrom. Thus, the ammonia under a pressure of above 25 pounds of atmosphere is forced into the wake of plow knife and does not directly contact it. That is to say, the ammonia is directed at a location behind the plow knife in a direction away from it and directly at the deposited band of dry fertilizer. Thus, there is no chilling of the plow knife, as is common in prior arrangements, to cause problems in the collection of soil and crop residue.

Further, there are formed integral with the plow knife, first and second inverted plow moldboards. One of the inverted moldboards serves to gather soil adjacent the side of the moving knife and directed behind the anhydrous ammonia conduit. The second inverted moldboard which is attached to the opposite side of the plow knife performs two functions: (1) it gathers soil adjacent the side of the moving plow knife and directs it rearwardly behind the knife over the deposited ammonia and band of dry fertilizer; and (2) packs down the soil gathered from both of the side moldboards in a compacting action to prevent the escape of the ammonia.

Other features and advantages of the instant invention will be appreciated by persons skilled in the art from the following detailed description of a preferred embodiment accompanied by the attached drawing wherein identical reference numerals will refer to like parts in the various views.

THE DRAWING

FIG. 1 is a side elevation view of apparatus adapted to be drawn by a traction vehicle for fertilizing according to the present invention;

FIGS. 2–4 are respectively left side, front, and right side views of a plow knife according to the present invention;

FIGS. 5–6 are top and bottom views of the inventive plow knife; and

FIG. 7 is a partially cut away side elevation view showing the plow knife of FIG. 3 in operation.

DETAILED DESCRIPTION

Turning now to FIG. 1, there is seen, partially in schematic form, apparatus in accordance with the present invention. A frame generally designated 10 includes first and second box members 11 and 12 extending transverse of the direction of travel of a traction vehicle pulling it, the rear wheel of which is partially illustrated. The frame 10 is supported by means of wheels 13.

The attachment shown in FIG. 1 is adapted to be pulled by a traction vehicle such as a conventional farm tractor.

Supported on the frame 10 is a sealed tank 15 which contains anhydrous ammonia held under pressure in the tank. Also supported by means of the frame 10 is a container or bin 18 which stores dry fertilizer, preferably in pellet form.

It will be appreciated by persons skilled in the art that certain modifications may be made to the illustrated embodiment—for example, the ammonia need not be supported by means of the frame 10, but could be supported by means of the traction vehicle. Further, the frame 10 need not necessarily be supported by the wheels 13 as illustrated. That is, the frame 10 could be cantilevered behind the traction vehicle as with conventional tractors with three-point hitches. Persons skilled in the art will readily modify or adapt the illustrated embodiment according to their own needs without departing from the inventive principle.

Also supported on the frame 10 by means of a bracket 20 is a plow knife generally designated by reference numeral 24. Although only one plow knife is illustrated, it will be apparent that the cross bars 11 and 12 could support a plurality of laterally-spaced knives, each similar in structure, operation and result to the illustrated one. Therefore, only one such plow knife need be described in further detail in order to fully understand the present invention.

A flexible conduit 30 couples the anhydrous ammonia from the tank 15 separately to each of the plow knives that may be used. In addition, a separate conduit 32 communicates the container 18 of dry fertilizer material with the plow knife 24.

Turning now to FIGS. 2–4, the plow knife is seen in greater detail. The plow knife comprises a generally vertical shank 35 which includes first and second parallel side plates 35a and 35b (FIGS. 5 and 6) integrally formed together at the leading edge 36. The separation between the plates 35a and 35b provides a vertical central conduit 37 (FIG. 7) through which the dry fertilizer falls under force of gravity. The dry fertilizer material preferably comprises phosphates, potash and secondary or trace elements, as desired. The side plates 35a and 35b forming the shank 35 may be formed of the same integral steel plate having a thickness of one-quarter inch and separated by a one-half inch interval forming the width of the channel 37. Thus, the overall transverse width of the shank 35 is one inch. An inclined back plate 39 defines the fourth side of the channel 37; and it extends slightly forwardly in its lowermost position 39a to funnel the falling dry fertilizer material toward a lower mouth portion 40 formed at the lowermost portion of the knife.

Integrally formed with the shank 35 is a forwardly-extending plow tooth 44 which forms a cutting edge and a lower portion or sole 45 which seals off the forward portion of the bottom of the knife forward of the aperture 40 for depositing the dry fertilizer material. An inclined forward baffle plate 46 is located in the channel 37 to funnel the dry fertilizer material toward the opening 40.

A metal tubular conduit 48 is attached, as by welding, to the rear portion of the shank 35 for conducting the ammonia behind the heel of the knife; and it includes a dispensing aperture 49 formed at the lowermost portion of a rearwardly and downwardly inclined nozzle 50. Thus, the anhydrous ammonia is forced through the conduit 48, the nozzle 50, and the aperture 49 in a direction which is inclined away from the direction of movement of the knife yet downwardly and into the already-deposited band of dry fertilizer material as best seen in FIG. 7. The resulting chemical reaction, as is well known in the art, produces an in situ fertilizer which enhances the uptake of phosphor in plants by a substantial margin without the above-described problems encountered in prior methods.

The outside diameter of the ammonia conduit 48 is substantially less than the width of the plow shank so that it may easily be pulled behind the plow shank without a reaction on the tube, especially the nozzle 50 which is inclined away from the shank. That is, in prior systems, there was a tendency to pull the tube away from the plow shank and so the dispensing orifice of the ammonia tube had to be very close to the shank and thus directed part of the ammonia into contact with the knife.

To one side of the shank 35 (namely the right side when viewing the knife from the rear) there is attached, as by welding, a first inverted plow moldboard 55. Referring to FIGS. 2, 5 and 6, the moldboard 55 extends slightly laterally immediately adjacent the right side of the shank 35, thence, it curves downwardly and rearwardly in a dovetail, converging portion 56 which extends generally vertically and is inclined away from the direction of travel of the shank. A forward or leading edge 57 of the inverted plow moldboard 55 is sharpened for cutting. The function of the plow moldboard 55 is to gather soil from the side of the knife and direct it rearwardly and behind the moving knife thus depositing the soil in the void or channel formed by the knife at a location directly above the point at which the ammonia is being applied to the band of dry fertilizer. This advantageously inhibits the evaporation and escape of gaseous ammonia.

A second inverted plow moldboard generally designated by reference numeral 60 is attached to the left side of the shank 35. Referring now to FIGS. 4-6, the left-side plow moldboard 60 includes a generally flat upper portion 61 which extends rearwardly and is slightly downwardly inclined from its attachment to the shank 35 to form a compacting action on any soil beneath it. The moldboard 60 also includes a side gathering portion 63 similar to the previously-described portion 56 of its complementary moldboard 55 for gathering lateral soil and directing it into the void formed behind the knife. Thus, lateral soil is gathered by each side moldboard and directed behind the moving knife at a location directly above the release and application of the ammonia. This soil is then compacted by means of the flat, inclined member 61 on the left-end of the moldboard 60 to prevent the escape of gaseous ammonia.

Having thus described in detail a preferred embodiment of my invention, the principal advantages and benefits over existing devices and systems will now be summarized. One of the main advantages is that a band of fertilizer is deposited at the base of a channel formed by a plow knife and that after it is deposited, anhydrous ammonia is applied to it—again at the base of the formed channel. Thus, the chemical reaction between the anhydrous ammonia and the dry fertilizer takes place at the bottom of the channel formed by the plow knife. Further, the present invention deposits a band of dry fertilizer at the bottom of a formed channel, and then applies anhydrous ammonia to the deposited band of dry fertilizer after the plow has moved through the channel. The ammonia is released at a location and in a direction away from the plow knife so that there is no cooling of the knife with its resultant collection of residue and soil to inhibit the action thereof and which in prior system had expanded the channel and permitted the escape of gaseous ammonia.

By thus first depositing the band of dry fertilizer at the base of the channel formed by the plow tooth and directing the anhydrous ammonia onto the deposited band behind the plow tooth, the chemical reaction takes place at a location remote from the location at which the dry fertilizer is deposited thus overcoming problems in prior systems which tended to clog the conduit through which the dry fertilizer was fed by reacting the ammonia with the fertilizer in the conduit. Still further, the present invention gathers lateral soil as the plow knife forms the channel, directs the soil from each side into the void behind the plow knife and directly above the point at which the ammonia is released to prevent the escape of gaseous ammonia.

Persons skilled in the art will be able to substitute various elements for the illustrated structure without departing from the inventive principle; and it is, therefore, intended that all such modifications and substitutions be covered as they are embraced within the spirit and scope of the invention.

What is claimed is:

1. A method of fertilizing soil comprising: forming a channel having a base between 6 to 12 inches in soil; depositing a band of dry fertilizer at the bottom of said channel; then passing a tube directing anhydrous ammonia onto said dry fertilizer after said band is deposited; then gathering lateral soil adjacent and above the point of application of said ammonia; and packing the said gathered soil onto the point of application of said ammonia to said band of deposited dry fertilizer immediately after said ammonia is applied to said dry fertilizer to prevent escape of gaseous ammonia.

2. The method of claim 1 wherein said step of forming such a channel comprises forcing an elongated plow knife through said soil.

3. The method of claim 1 wherein there are a plurality of such channels simultaneously formed.

4. Apparatus for fertilizing soil comprising: frame means including ground-engaging support means; a pressurized source of anhydrous ammonia carried by said frame means; a source of dry, particulate fertilizer capable of reacting with said ammonia and carried by said frame means; a plow knife mounted on said frame means and being adapted to form a channel having a base at a depth of about 6 to 12 inches beneath ground level when said frame means is pulled by a traction vehicle, said plow knife having a generally vertical conduit extending from a location adjacent the top thereof and extending through said knife to provide a discharge aperture at the bottom of said knife, said conduit being in fluid communication with said source of dry fertilizer whereby dry fertilizer will flow through said conduit to said discharge aperture and be deposited in said channel; a conduit carried by said frame behind said plow knife extending longitudinally thereof and in fluid communication with said anhydrous ammonia, said conduit having a release orifice immediately behind said discharge aperture of said plow knife for directing the pressurized ammonia directly onto said band of deposited fertilizer; and moldboard means attached to said plow knife and extending to the side thereof and being adapted to gather soil from the side of the furrow formed by the plow knife and to pass the gathered soil behind said plow knife and onto the ammoniated fertilizer.

5. The apparatus of claim 4 wherein said moldboard means comprises a first inverted moldboard attached to the side of said plow knife and including a first portion extending laterally thereof for gathering soil at one side of said knife and a second portion attached to the rear of said first portion and inclined downwardly relative to the horizontal for passing said gathered soil into the void behind said conduit and over the ammoniated band of fertilizer.

6. The apparatus of claim 5 further comprising a second inverted moldboard attached to the other side of said knife at a location higher than said first moldboard and including a first portion for engaging and gathering soil at the side of the furrow formed by said knife and a second portion attached to the rear of said first portion of said second moldboard to pass the gathered soil above the soil deposited by said first moldboard, said second portion of said second moldboard being inclined downwardly and rearwardly for compacting the soil gathered by said first and second moldboards above the location at which ammonia is applied to the deposited band of fertilizer.

References Cited

UNITED STATES PATENTS

| | | | |
|---|---|---|---|
| 486,200 | 11/1892 | Starks et al. | 111—7 |
| 2,315,204 | 3/1943 | Holle | 111—86 |
| 2,734,439 | 2/1956 | Padrick | 111—7X |
| 2,849,969 | 9/1958 | Taylor | 111—7 |
| 2,859,718 | 11/1958 | Barkley | 111—7 |
| 2,876,719 | 3/1959 | Holle | 111—7 |
| 3,384,039 | 5/1968 | Ratliff | 111—7 |

ROBERT E. BAGWILL, Primary Examiner

U.S. Cl. X.R.

111—81, 85